United States Patent
Wolf et al.

(10) Patent No.: US 6,412,361 B1
(45) Date of Patent: Jul. 2, 2002

(54) METHOD FOR DETERMINING A STARTING GEAR STEP

(75) Inventors: Andreas Wolf, Ravensburg; Matthias Winkel, Weingarten; Christoph Rüchardt, Wangen i. Allgäu; Bertram Wengert, Markdorf; Jürgen Müller, Friedrichshafen, all of (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 09/786,215

(22) PCT Filed: Aug. 28, 1999

(86) PCT No.: PCT/EP99/06352

§ 371 (c)(1),
(2), (4) Date: Mar. 1, 2001

(87) PCT Pub. No.: WO00/14435

PCT Pub. Date: Mar. 16, 2000

(30) Foreign Application Priority Data

Sep. 2, 1998 (DE) .......................... 198 39 838

(51) Int. Cl.[7] .................. F16H 61/02; B60K 41/04
(52) U.S. Cl. ............. 74/336 R; 477/900; 477/901; 477/115; 477/120; 701/51
(58) Field of Search .................. 477/115, 114, 477/125, 120, 900, 80, 904, 97, 143, 149, 156, 901, 119; 701/51, 59, 58, 54, 62, 65, 36, 80; 192/3.58; 74/335, 336 R; 180/336

(56) References Cited

U.S. PATENT DOCUMENTS

| | | | |
|---|---|---|---|
| 4,630,508 A | * 12/1986 | Klatt | |
| 4,648,291 A | 3/1987 | Klatt et al. | 74/866 |
| 4,854,194 A | * 8/1989 | Kaneko et al. | 477/900 |
| 5,406,862 A | 4/1995 | Amsallen | 74/336 |
| 5,408,895 A | 4/1995 | Chan et al. | 74/335 |
| 5,479,345 A | * 12/1995 | Amsallen | |
| 6,151,978 A | * 11/2000 | Huber | 74/336 R |

FOREIGN PATENT DOCUMENTS

| | | |
|---|---|---|
| DE | 33 34 718 A1 | 4/1985 |
| DE | 37 03 234 A1 | 8/1988 |
| DE | 40 06 653 A1 | 9/1990 |
| DE | 41 24 722 C2 | 11/1995 |
| EP | 0 120 189 A2 | 10/1984 |
| EP | 0 268 686 A1 | 6/1988 |
| EP | 0 584 984 A1 | 3/1994 |

* cited by examiner

*Primary Examiner*—Douglas C. Butler
(74) *Attorney, Agent, or Firm*—Davis & Bujold, P.L.L.C.

(57) ABSTRACT

The invention relates to a method for determining a starting gear step for a vehicle with a multi-speed stepped variable transmission, wherein the starting gear step is determined by an electronic control device which is dependent on the vehicle mass; and a second variable which depends on the vehicle state is determined from the vehicle mass, the current traction and the current vehicle acceleration resulting therefrom.

6 Claims, 2 Drawing Sheets

METHOD FOR DETERMINING A STARTING GEAR STEP

FIELD OF THE INVENTION

A method for determining a starting gear step for a vehicle having a stepped variable transmission with several gear steps.

BACKGROUND OF THE INVENTION

Depending on load and driving mode, different gear steps are adequate for starting of which one gear step is selected as starting gear step, particularly in heavy commercial vehicles with multi-speed stepped variable transmissions.

For an optimum start on a level road, e.g. it can be advantageous in an unloaded commercial vehicle having a 16-gear transmission to select the fifth gear as the starting step, while in a fully loaded vehicle on an inclined road, it may be necessary to start in the first or second gear. In a driving situation, if too low a starting gear step is selected, the consequence is several unnecessary gear changes. The starting operation will last longer if the selected starting gear step is too high, with the consequence of a high starting clutch load, or it has to be absolutely interrupted again when available traction force is not sufficient in the selected starting gear.

In vehicles with conventional mechanical stepped variable transmissions the driver selects the starting gear step, while methods for determining a starting gear step preferably find application in automated stepped variable transmissions and power shiftable automatic transmission. It is possible to let the suitable starting gear steps be determined by an electronic control device and suggested to the driver, e.g. via a display. Such a display can also be helpful for the driver also in a vehicle having a conventional mechanical stepped variable transmission. It is of course also possible to have this calculated starting gear automatically introduced by an automated stepped transmission or power shiftable transmission when the vehicle reaches a standstill.

U.S. Pat. No. 5,406,862 discloses a method for determining a starting gear step where the starting gear step is determined by an electronic control device according to the vehicle mass and the gradient of the road. The road gradient dependent on the driving mode is measured with an inclination sensor while the vehicle mass is determined according to the gradient of the road and acceleration of the vehicle.

The suitable starting gear step is stored in a characteristic field memory according to vehicle mass and road gradient.

On the basis of this prior art, the problem of the invention is to further develop a method for determining a starting gear step wherein no inclination sensor is needed.

SUMMARY OF THE INVENTION

While in the known method cited above the climbing resistance, which is a variable dependent on the driving mode, is determined by means of an inclination sensor, according to the invention, depending on the driving condition, the variable dependent on the driving mode is determined from the vehicle mass, an actual traction and an actual vehicle acceleration resulting therefrom while the vehicle moves.

In an advantageous development of the method the variable dependent on the driving mode comprises the climbing resistance and the rolling resistance of the vehicle during the starting operation. Hereby the positive tractional resistance is better reproduced which, in the starting operation, is composed mainly of the climbing resistance and the rolling resistance of the vehicle. The air resistance can be disregarded in the starting operation.

The tractional resistance, which is equal to the sum of rolling and climbing resistances, can be calculated by solving the movement equation from the variables: vehicle mass $M_{Fzg}$, actual traction $F_{zug}$ and vehicle acceleration $\alpha_{Fzg}$.

The vehicle mass can be indicated by the driver or also measured with sensors in the running gear. In particular it is advantageously determined by a method in which, using commonly available rotational speed sensors during two measurements offset in time within a measuring period, a traction variable and a movement variable resulting therefrom are respectively determined.

EP 0 666 435 A2 discloses such a method which comprises two measurements of the traction produced by the prime mover offset in time and the acceleration resulting therefrom. It is assumed that the unknown tractional resistance in two consecutive measurements is substantially the same for both measurements so that the unknown variable can be abridged. In this known method both during a traction phase and during a traction-free phase, while one clutch is opened for a gear shift of a stepped variable transmission, a value of a gear torque and a value of a vehicle acceleration respectively are determined, wherefrom the actual mass of the vehicle can be calculated.

It has proven to be especially advantageous if the first of the two measurements comprises a first data acquisition period, the second of the two measurements a second data acquisition period, the duration of both data acquisition periods is longer than a minimum duration, the traction variable corresponds to the timed integral of the traction acting during the respective data acquisition period, and the movement variable corresponds to the change of speed of the vehicle occurring during the respective data acquisition period. If this method is made the basis for determining the mass, the starting gear step can be determined without the need of an additional sensor.

The method for determining the mass is based on the following equation:

$$M_{Fzg} = \frac{\int_{t_0}^{t_1} F_{Zug} \, dt - M_{Gang}(v_1 - v_0)}{v_1 - v_0 - v_3 + v_2}$$

wherein:

$M_{Fzg}$ the vehicle mass to be determined in kg, $F_{zug}$ the traction or the engine torque calculated for the gear in N, $M_{gang}$ a correcting variable corresponding to the sum of the inertia torques of the engine, clutch and stepped variable transmission, reduced to the transitory movement of the vehicle in kg, t0, t1 initial and end moments of the traction phase, V0, V1 speeds of the vehicle at the beginning and end of the traction phase in m/s, V2, V3 speeds at the beginning and end of the traction-free phase in m/s.

At this point reference is made to the Applicant's unpublished older patent application, the object of which is a method for determining the mass. The contents of the application belong to the disclosure content of the instant application.

In one embodiment of the inventive method the starting gear step is determined according to an engine torque available for starting, and to a maximum slip time and/or to a maximum friction work of the starting clutch during the starting operation. To this end, there are first determined during the starting operation the engine torque available, a maximum admissible value of a slip time and/or a maximum admissible value for a friction work of the starting clutch. Beginning with a highest gear step adequate for starting it is then predetermined in a calculation loop depending on the ratio of the gear step, the vehicle mass, the tractional resistance, an engine torque available for starting, and values for the slip time and/or the friction work. These predetermined values are compared with the previously determined maximum admissible values. The calculation loop is repeated with the next lower gear step adequate for starting until a gear step is found in which the predetermined values are smaller than or equal to the maximum admissible values. The gear step is issued as the starting gear step.

The maximum admissible values for the slip time and/or the friction work are advantageously stored in the electronic control device—preferably in a characteristic field memory—according to the road gradient, the vehicle mass and/or the load state of the clutch, which takes into account the loading history of the clutch. Hereby a great assurance is obtained related to maladjustments which can lead to damages in the starting clutch. Likewise the engine torque available for starting can also be stored, according to the road gradient and/or the vehicle mass; not in all situations must a start occur below full engine load.

BRIEF DESCRIPTION OF THE DRAWINGS

The inventive method is explained in detail with reference to the enclosed drawings wherein.

DESCRIPTION OF THE PREFERRED EMBODIMENTS

Figure 1:
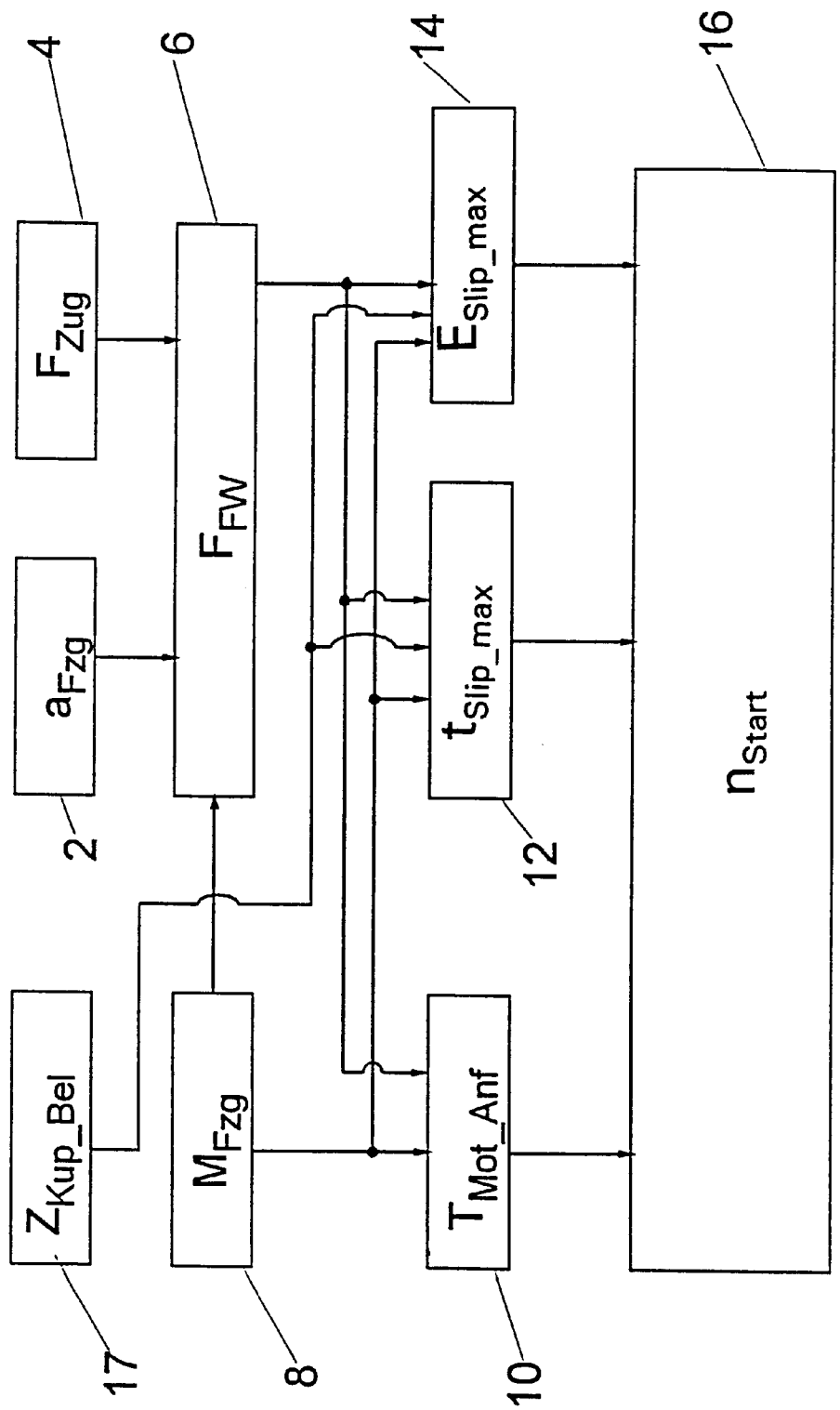
FIG. 1 is a block diagram of the inventive method.

In FIG. 1, 6 designates the block for calculating the tractional resistance which is dependent on driving mode from vehicle mass 8, traction 4 acting upon the input gears, and the vehicle acceleration 2 resulting therefrom. The engine torque 10 available for starting, the maximum admissible slip time of the starting clutch 12 during the starting operation and the maximum admissible friction work 14 are determined according to the vehicle mass 8, the actual tractional resistance 6 and a variable 17 descriptive of the load state of the clutch, respectively. In block 16, the starting gear is determined according to the variables 10, 12, 14.

The following method steps individually go on in the blocks:

The momentary vehicle acceleration $\alpha_{Fzg}$ 2 corresponds to the inference of the vehicle speed according to time which is preferably read by the gear rotational speed sensors.

The traction $F_{zug}$ 4 acting upon the input gears of the vehicle is determined from engine torque and the reduction ratio existing in the respective gear between engine and input gear, also taking into account the efficiency of the individual components of the drive line. The signal for the engine torque is preferably made available by the engine control or can alternatively bet determined from the position of the load transmitter, the engine rotational speed and an engine characteristic field stored in the control device.

In block 6, the tractional resistance is determined according to the following equation:

$$F_{FW} = F_{zug} - M_{Fzg} * \alpha_{Fzg}$$

wherein:

$F_{zug}$ is the traction, $M_{Fzg}$ is the vehicle mass and $\alpha_{Fzg}$ is the vehicle acceleration.

Alternately, the tractional resistance when disregarding the air resistance is also equal to the sum of climbing and rolling resistances, $$F_{FW} = F_{Steig} + F_{Roll} = M_{Fzg} * g(\sin(\alpha) + K_{Roll0} \cos(\alpha))$$

wherein:

g is the acceleration due to gravity, $\alpha$ is the climbing angle and $K_{Roll}$ 0 is the vehicle acceleration.

If needed, the actual climbing angle $\alpha$ can also be determined by comparing of the two equations.

The torque 10 ($T_{Mot\_Anf}$) available for starting, the maximum admissible slip time 12 ($t_{slip\_max}$) during the starting operation, and the maximum admissible friction work 14 ($E_{slip\_max}$) are advantageously stored in characteristic field memories of the electronic control device according to the vehicle mass, the tractional resistance and the load state of the clutch 17. The greater the vehicle mass and tractional resistance and the smaller the former clutch load, the greater are the values of the variables stored in the characteristic fields. The load of the starting clutch can be directly influenced and reliably upwardly limited by the variables stored in the characteristic fields.

The load state of the clutch can be described, e.g. with reference to temperatures, or to a lapsed time since the last clutch load. Particularly adequate for describing the load state is a mathematical variable which takes into account the friction work accumulated on the clutch in the course of time and which less strictly evaluates the friction work further in the past than the friction work closer in time.

Figure 2:
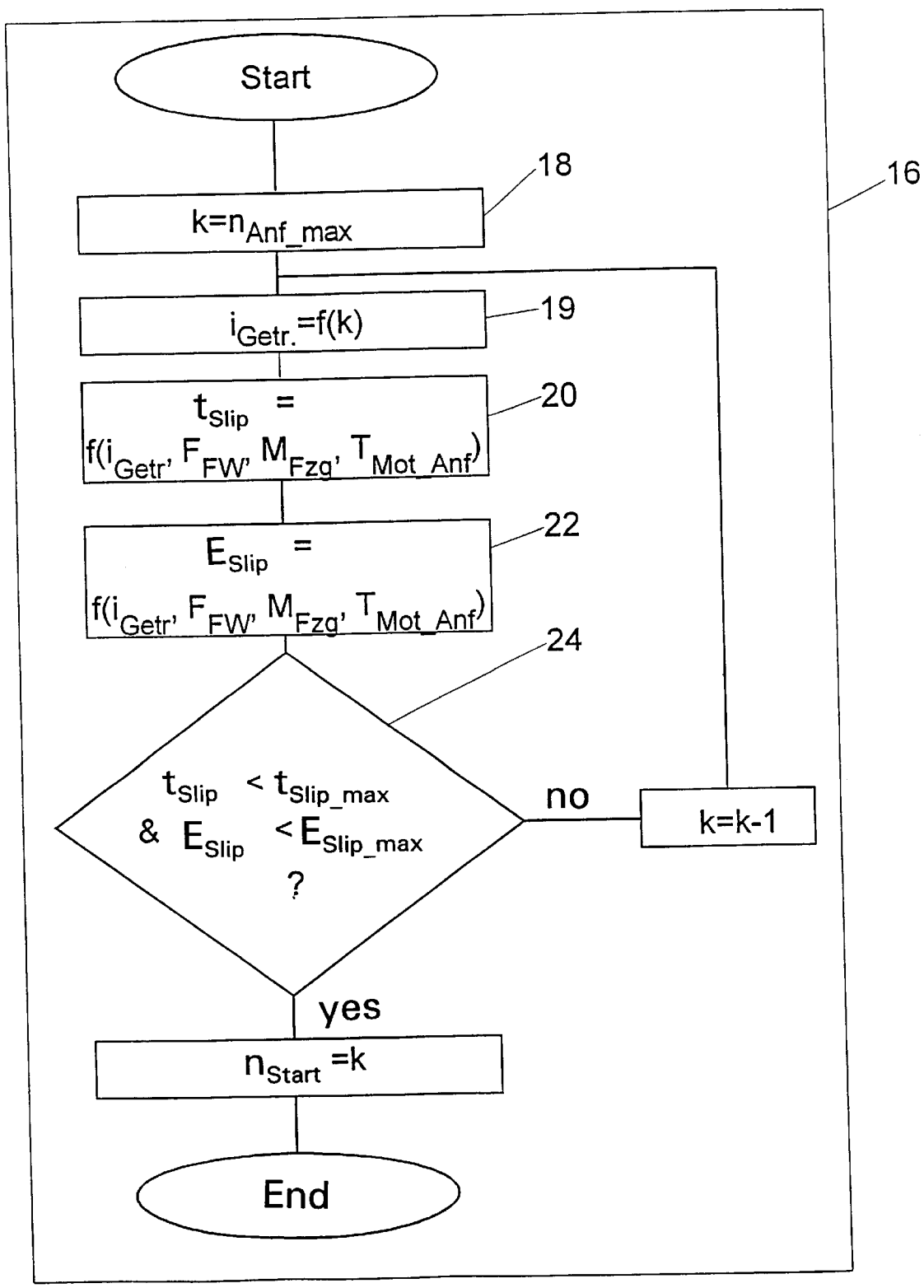
FIG. 2 is a flow chart of one part of the inventive method.

The algorithm determinant of the starting gear for block 16 is explained with reference to FIG. 2. The numeric variable k is first set in block 18 equal to a value corresponding to the highest gear step adequate for starting. In block 19, the transmission ratio is determined according to the gear step. The transmission ratios are stored in the electronic control device. During a starting operation, a probable value is predetermined for this gear step for both the slip time 20 and the friction work 22, respectively, which depends on the ratio fo the gear step, the actual vehicle mass, the actual tractional resistance, and the available engine torque. In block 24, the predetermined values are compared with the maximum admissible values 12, 14 previously determined. If the predetermined values are smaller than or equal to the maximum admissible values, the actual value of the numeric variable k is issued as starting gear step.

When at least one of the predetermined values is greater than the admissible value, the calculation loop is repeated with the next smaller gear step adequate for starting.

The tractional resistance calculation, aside from some exceptional cases which will not be discussed here in detail, is carried out continuously during the drive, i.e. in short periods so that this method always makes an adequate starting gear step available when the vehicle stands still.

What is claimed is:

1. A method for determining a starting gear step for a vehicle having a stepped variable transmission, said transmission having at least two gear steps, said method comprising the following steps:

connecting the stepped variable transmission, said transmission having an input side and an output side, on the input side with an engine that produces an engine torque, by an optionally engageable starting clutch, and operatively on the output side with input gears of the vehicle, to transmit a traction;

determining the starting gear step by an electronic control device according to at least a vehicle mass (8) and a second variable (6), said second variable dependent on a driving mode comprising a climbing resistance of the vehicle;

constantly determining during a drive an actual value of the second variable (6) from the vehicle mass (8), an actual traction (4), and an actual vehicle acceleration (2) resulting therefrom.

2. The method according to claim 1, further comprising the following step of:

determining the second variable (6) dependent on the driving mode comprising a combination of the climbing resistance of the vehicle and a rolling resistance of the vehicle.

3. The method according to claim 1, further comprising the steps of:

determining the vehicle mass (8) by a method comprising at least a first measurement and a second measurement, said at least first and second measurements being offset in time within a measuring period;

determining by said at least first measurement at least one traction variable produced by the engine, said at least one traction variable indicative of a traction acting upon the input gears of the vehicle in a direction of movement;

identifying by said at least second measurement at least one movement variable indicative of a movement of the vehicle;

taking one of the at least first and second measurements during a traction-free phase during which the starting clutch is opened for a purpose of a gear shift of the stepped variable transmission;

taking the other of the at least first and second measurements during a traction phase during which the starting clutch is closed and a traction is transmitted to the input gears; and calculating the actual vehicle mass with the at least one traction variable and the at least one movement variable of each of the at least first and second measurements offset in time.

4. The method according to claim 3, further comprising the steps of:

designating the at least first measurement as a first data acquisition period;

designating the at least second measurement as a second data acquisition period;

setting the duration of the at least first and second data acquisition periods longer than a minimum duration;

determining the traction variable corresponding to a timed integral of the traction acting during one of the first and second data acquisition periods; and determining the movement variable corresponding to a speed change of the vehicle during one of the first and second data acquisition periods.

5. The method according to claim 1, further comprising the steps of:

determining at least one of a first maximum admissible value (12) for a slip time during a start, a second maximum admissible value (14) for a friction work of the starting clutch during the start, and an engine torque (10) available for the start, beginning with a highest gear step adequate for the start;

predetermining in a calculation loop according to a ratio of a gear step (19), at least one of the vehicle mass (8), a first variable value for a slip time (20), a second variable value for a friction work (22);

comparing the predetermined first and second variable values (20, 22) with the first and second maximum admissible values (12, 14);

repeating the calculation loop with a next smaller gear step adequate for the start when at least one of the predetermined first and second variable values (20, 22) is greater than the first and second maximum admissible values (12, 14); and issuing the starting gearstep when the predetermined first and second variable values (20, 22) are one of smaller than and equal to the first and second maximum admissible values (12, 14).

6. The method according to claim 5, further comprising the step of:

storing maximum admissible values (12, 14) for one of the slip time and the friction work in a characteristic field memory of the electronic control device according to at least one of a road gradient, the vehicle mass (8) and a load state of the clutch (17).

* * * * *